(12) United States Patent
Holman

(10) Patent No.: US 10,123,513 B2
(45) Date of Patent: Nov. 13, 2018

(54) CALF WEANING ASSEMBLY

(71) Applicant: Kenneth Holman, Willamina, OR (US)

(72) Inventor: Kenneth Holman, Willamina, OR (US)

(*) Notice: Subject to any disclaimer, the term of this patent is extended or adjusted under 35 U.S.C. 154(b) by 280 days.

(21) Appl. No.: 15/217,518

(22) Filed: Jul. 22, 2016

(65) Prior Publication Data

US 2018/0020641 A1 Jan. 25, 2018

(51) Int. Cl.
*A01K 15/04* (2006.01)
*A01K 19/00* (2006.01)
*A01K 15/02* (2006.01)
*A01K 11/00* (2006.01)

(52) U.S. Cl.
CPC ............ *A01K 19/00* (2013.01); *A01K 11/004* (2013.01); *A01K 15/029* (2013.01)

(58) Field of Classification Search
CPC .... A01K 19/00; A01K 15/029; A01K 11/004; A01K 27/009
USPC .................................................. 119/822, 908
See application file for complete search history.

(56) References Cited

U.S. PATENT DOCUMENTS

| | | | | |
|---|---|---|---|---|
| 2,212,160 A * | 8/1940 | Kelly | ..................... | A01K 19/00 119/822 |
| 2,263,503 A | 11/1941 | Kennedy | | |
| 2,510,337 A | 6/1950 | Franklin | | |
| 2,602,421 A * | 7/1952 | Barker | ................... | A01K 19/00 119/822 |
| 2,604,069 A * | 7/1952 | Hobby | ................... | A01K 19/00 119/833 |
| 2,628,592 A * | 2/1953 | Johnston | ............... | A01K 19/00 119/815 |
| 2,722,912 A * | 11/1955 | Lindstrom | ............ | A01K 19/00 119/822 |
| 2,783,740 A * | 3/1957 | Haggard | ................ | A01K 19/00 119/815 |
| 2,842,099 A * | 7/1958 | Miller | .................... | A01K 19/00 119/822 |
| 2,940,425 A | 6/1960 | Dykens | | |
| 4,945,860 A * | 8/1990 | Walker | ................... | A01K 15/02 119/837 |
| 6,817,165 B1 * | 11/2004 | Bateman | ................... | B68B 1/02 119/828 |
| 7,677,204 B1 | 3/2010 | James | | |
| 7,757,640 B2 * | 7/2010 | Barclay | ................. | A01K 13/00 119/719 |

(Continued)

FOREIGN PATENT DOCUMENTS

EP 2220932 2/2000

*Primary Examiner* — Trinh T Nguyen

(57) ABSTRACT

A calf weaning assembly includes a first ear tag that may be worn on an ear of a cow. The first ear tag is in electrical communication with cow's skin. Thus, the first ear tag selectively delivers an electric shock to the cow. A second ear tag may be worn on an ear of a calf. The second ear tag is in electrical communication with calf's skin. Thus, the second ear tag selectively delivers an electric shock to the calf. Each of the first ear tag and the second ear tag deliver the electric shock when the calf makes physical contact with the cow thereby inhibiting the calf from suckling on the cow. A remote unit is in electrical communication with each of the first ear tag and the second ear tag. The remote unit controls operational parameters of each of the first ear tag and the second ear tag.

14 Claims, 5 Drawing Sheets

(56) References Cited

U.S. PATENT DOCUMENTS

D672,922 S     12/2012  Ritchey et al.
2018/0098522 A1*  4/2018  Steinfort .............. A01K 11/004

* cited by examiner

CALF WEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to weaning devices and more particularly pertains to a new weaning device for weaning a calf from a cow.

BRIEF SUMMARY OF THE INVENTION

An embodiment of the disclosure meets the needs presented above by generally comprising a first ear tag that may be worn on an ear of a cow. The first ear tag is in electrical communication with skin of the cow. Thus, the first ear tag selectively delivers an electric shock to the cow. A second ear tag may be worn on an ear of a calf. The second ear tag is in electrical communication with skin of the calf. Thus, the second ear tag selectively delivers an electric shock to the calf. Each of the first ear tag and the second ear tag deliver the electric shock when the calf makes physical contact with the cow thereby inhibiting the calf from suckling on the cow. A remote unit is in electrical communication with each of the first ear tag and the second ear tag. The remote unit controls operational parameters of each of the first ear tag and the second ear tag.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
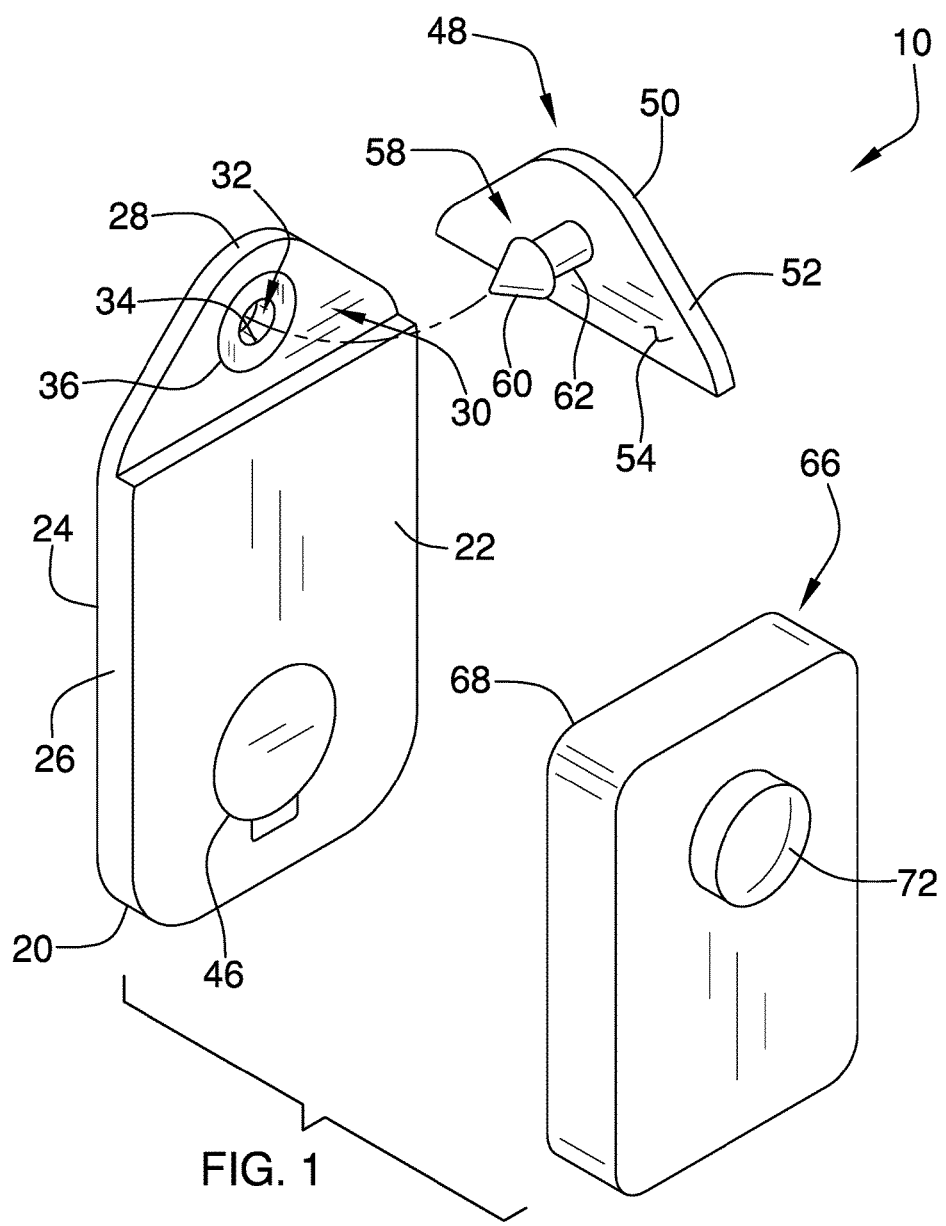
FIG. 1 is a perspective view of a calf weaning assembly according to an embodiment of the disclosure.
Figure 2:
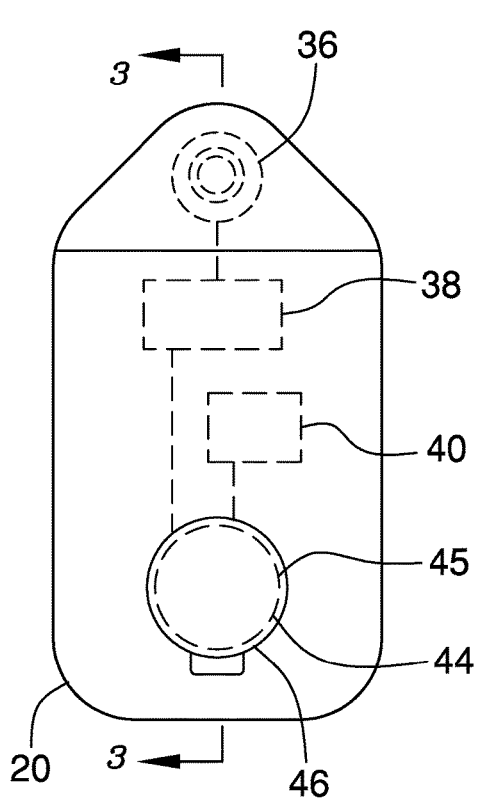
FIG. 2 is a front phantom view of an embodiment of the disclosure.
Figure 3:
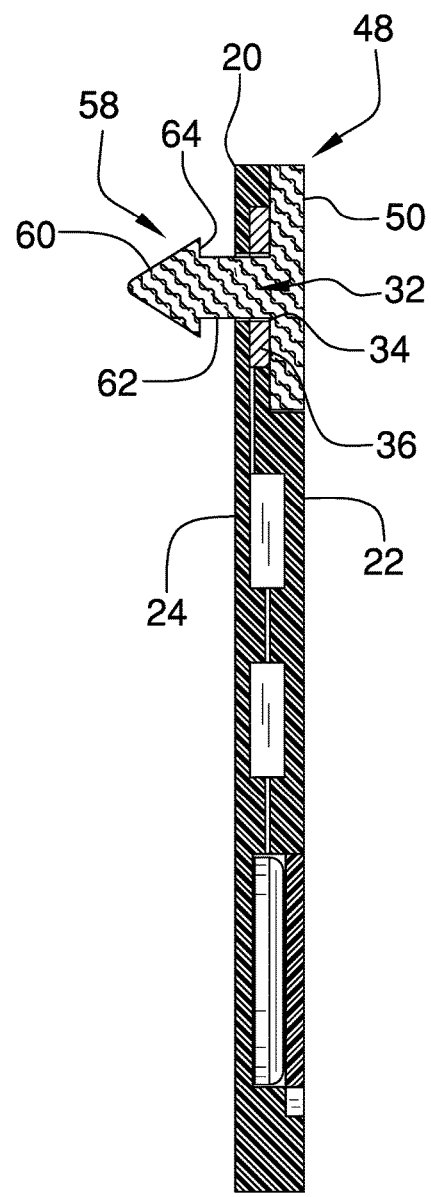
FIG. 3 is a cross sectional view taken along line 3-3 of FIG. 2 of an embodiment of the disclosure.
Figure 4:
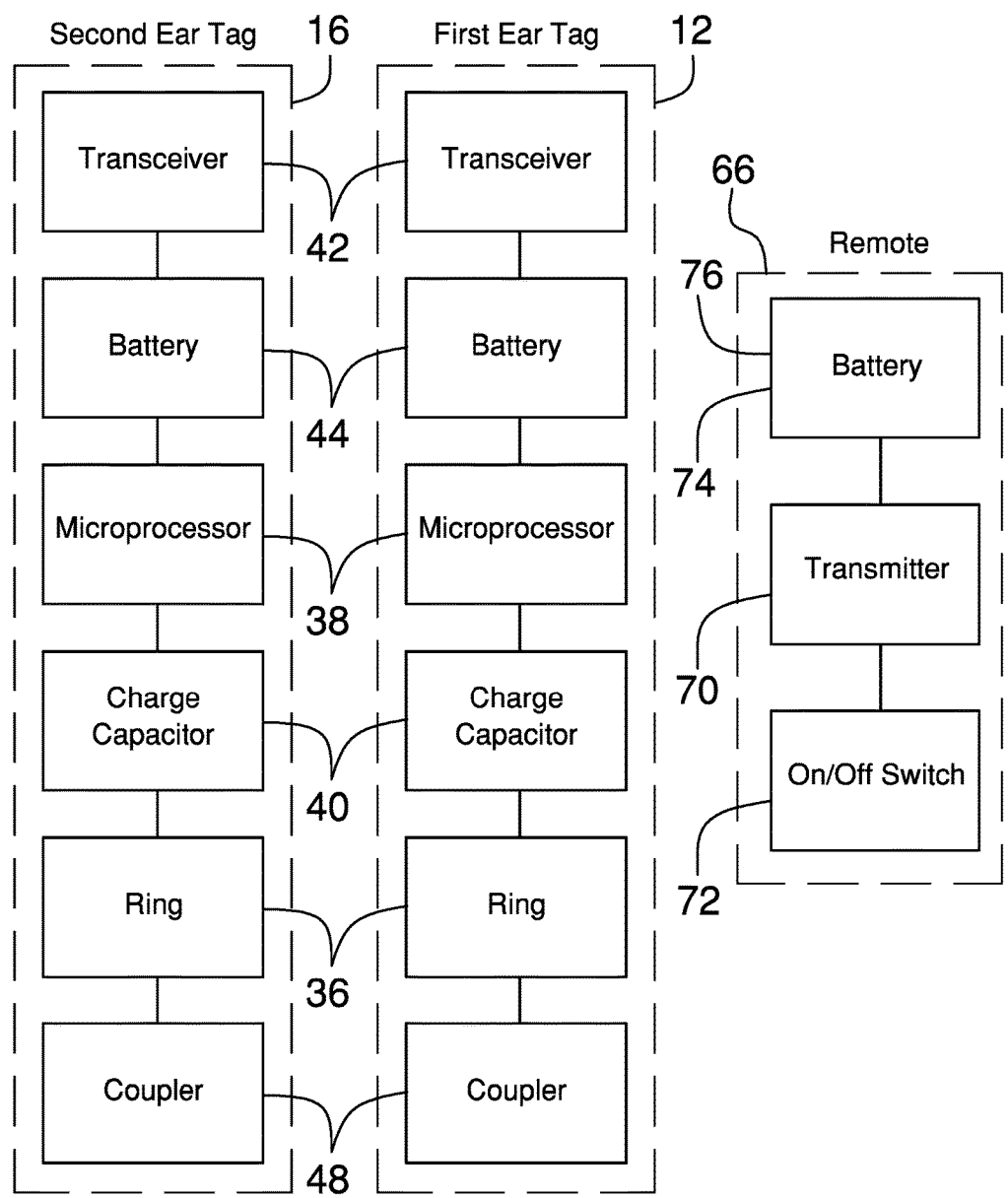
FIG. 4 is a schematic view of an embodiment of the disclosure.
Figure 5:
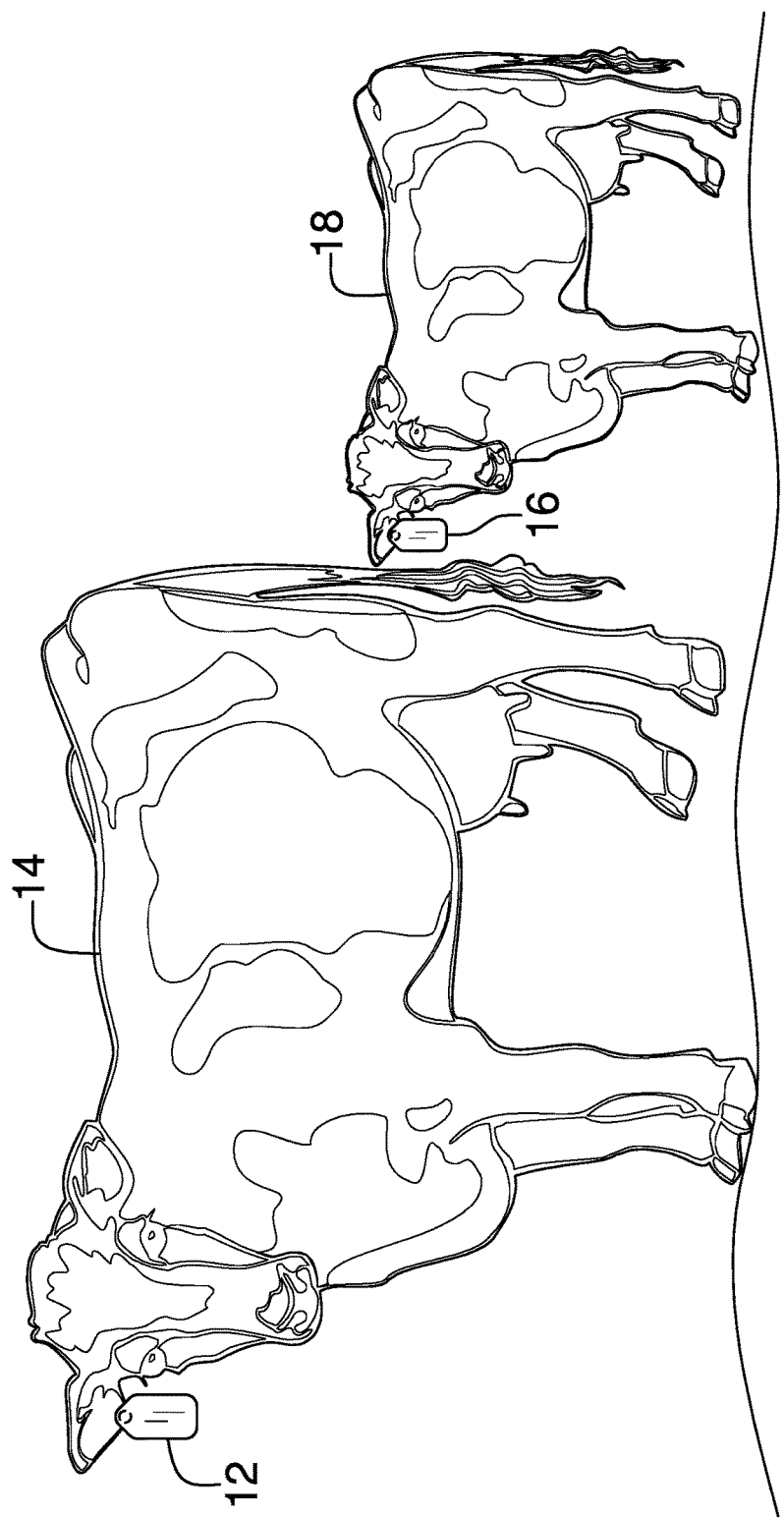
FIG. 5 is a perspective in-use view of an embodiment of the disclosure.

With reference now to the drawings, and in particular to FIGS. 1 through 6 thereof, a new weaning device embodying the principles and concepts of an embodiment of the disclosure and generally designated by the reference numeral 10 will be described.

As best illustrated in FIGS. 1 through 6, the calf weaning assembly 10 generally comprises a first ear tag 12 that may be worn on an ear of a cow 14. The first ear tag 12 is in electrical communication with skin of the cow 14. Thus, the first ear tag 12 selectively delivers an electric shock to the cow 14. The cow 14 may be a bovine cow or the like.

A second ear tag 16 is provided and the second ear tag 16 may be worn on an ear of a calf 18. The second ear tag 16 is in electrical communication with skin of the calf 18. Thus, the second ear tag 16 selectively delivers an electric shock to the calf 18. The calf 18 may be a bovine calf or the like. The first ear tag 12 is in electrical communication with the second ear tag 16 when the calf 18 makes physical contact with the cow 14. Thus, each of the first ear tag 12 and the second ear tag 16 deliver the electric shock thereby inhibiting the calf 18 from suckling on the cow 14.

Each of the first ear tag 12 and the second ear tag 16 comprises a tag 20 that has a front surface 22, a rear surface 24 and a peripheral edge 26 extending therebetween. The peripheral edge 26 has a top side 28 and the top side 28 tapers to a point. The front surface 22 has a recess 30 extending toward the rear surface. The recess 30 extends downwardly from the top side 28. The tag 20 has an opening 32 extending through the front surface 22 and the rear surface. The opening 32 has a bounding edge 34.

A ring 36 is provided. The ring 36 is coupled to the tag 20. The ring 36 is coextensive with the bounding edge 34 of the opening 32. The ring 36 is comprised of an electrically conductive material.

A processor 38 is positioned within the tag 20 and the processor 38 is electrically coupled to the ring 36. The processor 38 may comprise an electronic processor 38 or the like. A capacitor 40 is positioned within the tag 20 and the capacitor 40 stores an electrical charge. The capacitor 40 is electrically coupled to the processor 38. Thus, the capacitor 40 selectively delivers the electrical charge to the ring 36. The capacitor 40 may store an electrical voltage 20e ranging between three thousand volts and ten thousand volts.

A first transceiver 42 is provided. The first transceiver 42 is positioned within the tag 20. The first transceiver 42 is electrically coupled to the processor 38. The first transceiver 42 may be a radio frequency transceiver or the like.

A power supply 44 is provided. The power supply 44 is positioned within the tag 20. The power supply 44 is electrically coupled to the processor 38. The power supply 44 comprises at least one battery 45. The tag 20 includes a battery cover 46. The battery cover 46 may be positioned on the front surface 22 of the tag 20. The power supply 44 is positioned beneath the battery cover 46.

A coupler 48 is selectively extended through the opening 32 in the tag 20. The coupler 48 is comprised of an electrically conductive material. Thus, the coupler 48 is in electrical communication with the ring 36. The coupler 48 receives the electrical charge from the capacitor 40.

The coupler 48 may pierce the ear of an associated one of the cow 14 and the calf 18. Thus, the coupler 48 is in electrical communication with the skin of the associated cow 14 and calf 18. The coupler 48 corresponding to the first ear tag 12 is in electrical communication with the coupler 48 corresponding to the second ear tag 16 when the calf 18 makes physical contact with the cow 14. The processor 38 corresponding to each of the first ear tag 12 and the second ear tag 16 generates a trigger sequence when the coupler 48 detects the physical contact. The capacitor 40 corresponding to each of the first ear tag 12 and the second ear tag 16 discharges when the processor 38 generates the trigger sequence. Thus, the coupler 48 corresponding to each of the first ear tag 12 and the second ear tag 16 delivers the electrical charge to the corresponding cow 14 and calf 18.

The coupler 48 comprises a panel 50 that has a peripheral edge 52 and a first surface 54. The peripheral edge 26 has a plurality of intersecting sides 56. Thus, the panel 50 may have a triangular shape. The panel 50 is selectively positioned in the recess 30 having the first surface 54 abutting the front surface 22 of the tag 20.

An arrow 58 is coupled to and extends away from the first surface 54. The arrow 58 has a tip 60 and a shaft 62. The tip 60 has a bounding surface 64 with respect to the shaft 62. The arrow 58 is extended through the opening 32 in the tag 20. Thus, the tip 60 may pierce the ear of the associated cow 14 and calf 18 thereby retaining the tag 20 on the associated cow 14 and calf 18. The shaft 62 may be comprised of a cutable material. Thus, the shaft 62 may be cut to remove the coupler 48 from the ear.

A remote unit 66 is provided. The remote unit 66 may be carried by a user. The remote unit 66 is in electrical communication with each of the first ear tag 12 and the second ear tag 16. The remote unit 66 controls operational parameters of each of the first ear tag 12 and the second ear tag 16.

The remote unit 66 comprises a housing 68. A transmitter 70 is positioned within the housing 68. The transmitter 70 is in electrical communication with the transceiver. The transmitter 70 may be a radio frequency transmitter 70 or the like.

A button 72 is coupled to the housing 68 and the button 72 may be manipulated. The button 72 is electrically coupled to the transmitter 70. The transmitter 70 communicates a shut off command to the transceiver when the button 72 is manipulated. Thus, each of the first ear tag 12 and the second ear tag 16 is turned off. Each of the first ear tag 12 and the second ear tag 16 may be removed from the cow 14 and the calf 18 when the first ear tag 12 and the second ear tag 16 are turned off.

A remote power supply 74 is provided. The remote power supply 74 is positioned within the housing 68. The remote power supply 74 is electrically coupled to the transmitter 70. The remote power supply 74 comprises at least one battery 76.

Figure 6:
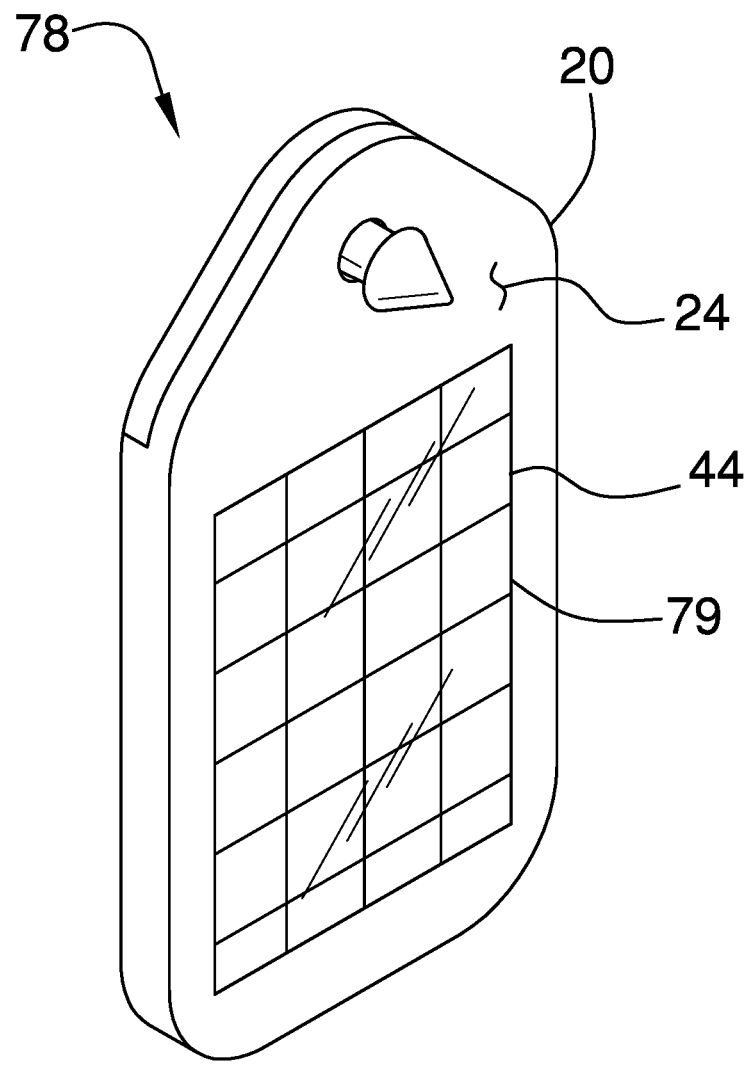
FIG. 6 is a perspective view of an alternative embodiment of the disclosure.

In an alternative embodiment 78 as shown in FIG. 6, the power supply 44 may comprise a solar cell 79. The solar cell 79 may be positioned on the rear surface 24 of the tag 20. Thus, the solar cell 79 is exposed to sunlight. The solar cell 79 may convert sunlight into electrical energy to power the processor 38.

In use, the first ear tag 12 is placed on the ear of the cow 14. The coupler 48 corresponding to the first ear tag 12 is extended through the opening 32 corresponding to the first ear tag 12. The coupler 48 corresponding to the first ear tag 12 pierces the ear of the cow 14. The second ear tag 16 is placed on the ear of the calf 18. The coupler 48 corresponding to the second ear tag 16 is extended through the opening 32 corresponding to the second ear tag 16. The coupler 48 corresponding to the second ear tag 16 pierces the ear of the calf 18.

The processor 38 corresponding to the first ear tag 12 is placed in electrical communication with the processor 38 corresponding to the second ear tag 16 when the calf 18 attempts to suckle. The processor 38 corresponding to the first ear tag 12 communicates with the processor 38 corresponding to the second ear tag 16 through electrical conductivity of the skin of the calf 18 and the cow 14. The capacitor 40 corresponding to each of the first ear tag 12 and the second ear tag 16 discharges when the processor 38 generates the trigger sequence. Thus, the calf 18 is inhibited from suckling on the cow 14. The first ear tag 12 and the second ear tag 16 facilitate the calf 18 to be left in close proximity to the cow 14 while the calf 18 is weaning. Thus, discomfort and stress on the calf 18 and the cow 14 are reduced while the calf 18 is weaning.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A calf weaning assembly configured to deliver an electric shock to a calf when the calf attempts to suckle, said assembly comprising:

a first ear tag being configured to be worn on an ear of a cow, said first ear tag being configured to be in electrical communication with skin of the cow thereby facilitating said first ear tag to selectively deliver an electric shock to the cow, a second ear tag being configured to be worn on an ear of a calf, said second ear tag being configured to be in electrical communication with skin of the calf thereby facilitating said second ear tag to selectively deliver an electric shock to the calf, said first ear tag being in electrical communication with said second ear tag when the calf makes physical contact with the cow wherein each of said first ear tag and said second ear tag are configured to deliver the electric shock thereby inhibiting the calf from suckling on the cow; and a remote unit being configured to be carried, said remote unit being in electrical communication with each of said first ear tag and said second ear tag, said remote unit controlling operational parameters of each of said first ear tag and said second ear tag.

2. The assembly according to claim 1, wherein each of said first ear tag and said second ear tag comprises a tag having a front surface, a rear surface and a peripheral edge extending therebetween, said peripheral edge having a top side, said top side tapering to a point, said front surface having a recess extending toward said rear surface, said recess extending downwardly from said top side, said tag having an opening extending through said front surface and said rear surface, said opening having a bounding edge.

3. The assembly according to claim 2, further comprising a ring being coupled to said tag such that said ring is coextensive with said bounding edge of said opening, said ring being comprised of an electrically conductive material.

4. The assembly according to claim 3, further comprising a processor being positioned within said tag, said processor being electrically coupled to said ring.

5. The assembly according to claim 4, further comprising a capacitor being positioned within said tag, said capacitor being configured to store an electrical charge, said capacitor being electrically coupled to said processor wherein said capacitor is configured to selectively deliver the electrical charge to said ring.

6. The assembly according to claim 4, further comprising a first transceiver being positioned within said tag, said first transceiver being electrically coupled to said processor.

7. The assembly according to claim 4, further comprising a power supply being positioned within said tag, said power supply being electrically coupled to said processor, said power supply comprising at least one battery.

8. The assembly according to claim 5, further comprising a coupler being selectively extended through said opening, said coupler being comprised of an electrically conductive material such that said coupler is in electrical communication with said ring wherein said coupler is configured to receive the electrical charge from said capacitor, said coupler being configured to pierce an ear of an associated one of the cow and the calf thereby facilitating said coupler to be in electrical communication with the skin of the associated cow and calf, said coupler corresponding to the cow being configured to detect when the calf makes physical contact with the cow thereby facilitating said coupler corresponding to each of the cow and the calf to deliver the electrical charge to the corresponding cow and calf.

9. The assembly according to claim 8, wherein said coupler comprises a panel having a peripheral edge and a first surface, said peripheral edge having a plurality of intersecting sides, said panel being selectively positioned in said recess having said first surface abutting said front surface of said tag.

10. The assembly according to claim 9, further comprising an arrow being coupled to and extending away from said first surface, said arrow having a tip, said arrow being extended through said opening in said tag wherein said arrow is configured to pierce the ear of the associated cow and calf thereby retaining said tag on the associated cow and calf.

11. The assembly according to claim 10, wherein:

each of said first ear tag and said second ear tag includes a transceiver; and said remote unit comprises:
a housing, and
a transmitter being positioned within said housing, said transmitter being in electrical communication with said transceiver corresponding to each of said first ear tag and said second ear tag.

12. The assembly according to claim 11, further comprising a button being coupled to said housing wherein said button is configured to be manipulated, said button being electrically coupled to said transmitter, said transmitter communication a shut off command to said transceiver when said button is manipulated such that each of said first ear tag and said second ear tag is turned off.

13. The assembly according to claim 11, further comprising a remote power supply being positioned within said housing, said remote power supply being electrically coupled to said transmitter, said remote power supply comprising at least one battery.

14. A calf weaning assembly configured to deliver an electric shock to a calf when the calf attempts to suckle, said assembly comprising:

a first ear tag being configured to be worn on an ear of a cow, said first ear tag being configured to be in electrical communication with skin of the cow thereby facilitating said first ear tag to selectively deliver an electric shock to the cow, a second ear tag being configured to be worn on an ear of a calf, said second ear tag being configured to be in electrical communication with skin of the calf thereby facilitating said second ear tag to selectively deliver an electric shock to the calf, said first ear tag being in electrical communication with said second ear tag when the calf makes physical contact with the cow wherein each of said first ear tag and said second ear tag are configured to deliver the electric shock thereby inhibiting the calf from suckling on the cow, each of said first ear tag and said second ear tag comprising:

a tag having a front surface, a rear surface and a peripheral edge extending therebetween, said peripheral edge having a top side, said top side tapering to a point, said front surface having a recess extending toward said rear surface, said recess extending downwardly from said top side, said tag having an opening extending through said front surface and said rear surface, said opening having a bounding edge, a ring being coupled to said tag such that said ring is coextensive with said bounding edge of said opening, said ring being comprised of an electrically conductive material, a processor being positioned within said tag, said processor being electrically coupled to said ring, a capacitor being positioned within said tag, said capacitor being configured to store an electrical charge, said capacitor being electrically coupled to said processor wherein said capacitor is configured to selectively deliver the electrical charge to said ring, a first transceiver being positioned within said tag, said first transceiver being electrically coupled to said processor, a power supply being positioned within said tag, said power supply being electrically coupled to said processor, said power supply comprising at least one battery, a coupler being selectively extended through said opening, said coupler being comprised of an electrically conductive material such that said coupler is in electrical communication with said ring wherein said coupler is configured to receive the electrical charge from said capacitor, said coupler being configured to pierce an ear of an associated one of the cow and the calf thereby facilitating said coupler to be in electrical communication with the skin of the associated cow and calf, said coupler corresponding to the cow being configured to detect when the calf makes physical contact with the cow thereby facilitating said coupler corresponding to each of the cow and the calf to deliver the electrical charge to the corresponding cow and calf, said coupler comprising:

a panel having a peripheral edge and a first surface, said peripheral edge having a plurality of intersecting sides, said panel being selectively positioned in said recess having said first surface abutting said front surface of said tag, and an arrow being coupled to and extending away from said first surface, said arrow having a tip, said arrow being extended through said opening in said tag wherein said arrow is configured to pierce the ear of the associated cow and calf thereby retaining said tag on the associated cow and calf; and a remote unit being configured to be carried, said remote unit being in electrical communication with each of said first ear tag and said second ear tag, said remote unit controlling operational parameters of each of said first ear tag and said second ear tag, said remote unit comprising:

a housing, a transmitter being positioned within said housing, said transmitter being in electrical communication with said transceiver, a button being coupled to said housing wherein said button is configured to be manipulated, said button being electrically coupled to said transmitter, said transmitter communication a shut off command to said transceiver when said button is manipulated such that each of said first ear tag and said second ear tag is turned off, and a remote power supply being positioned within said housing, said remote power supply being electrically coupled to said transmitter, said remote power supply comprising at least one battery.

* * * * *